L. LIESMANN.
FARM GATE.
APPLICATION FILED AUG. 6, 1907.
899,747.
Patented Sept. 29, 1908.
2 SHEETS—SHEET 1.
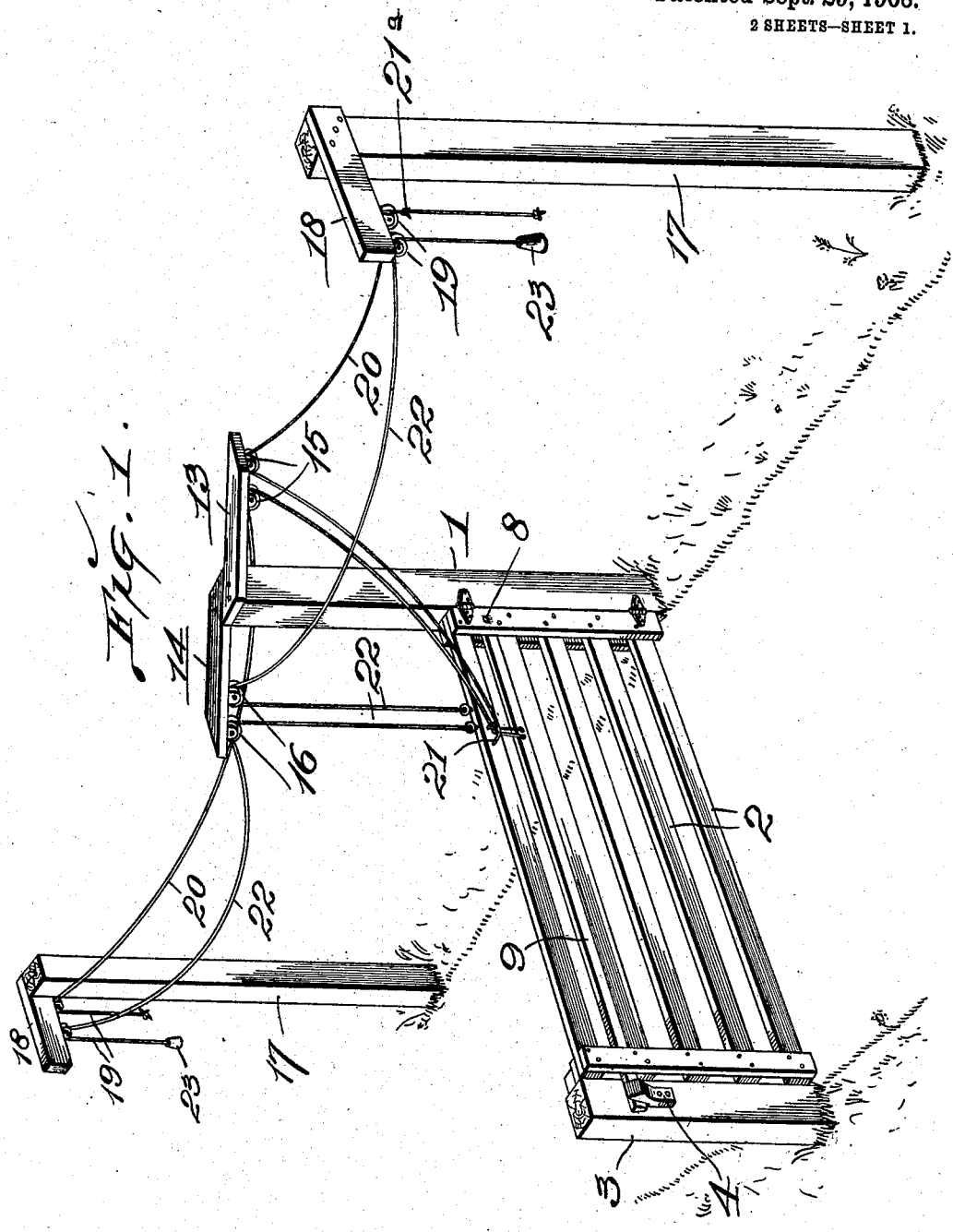

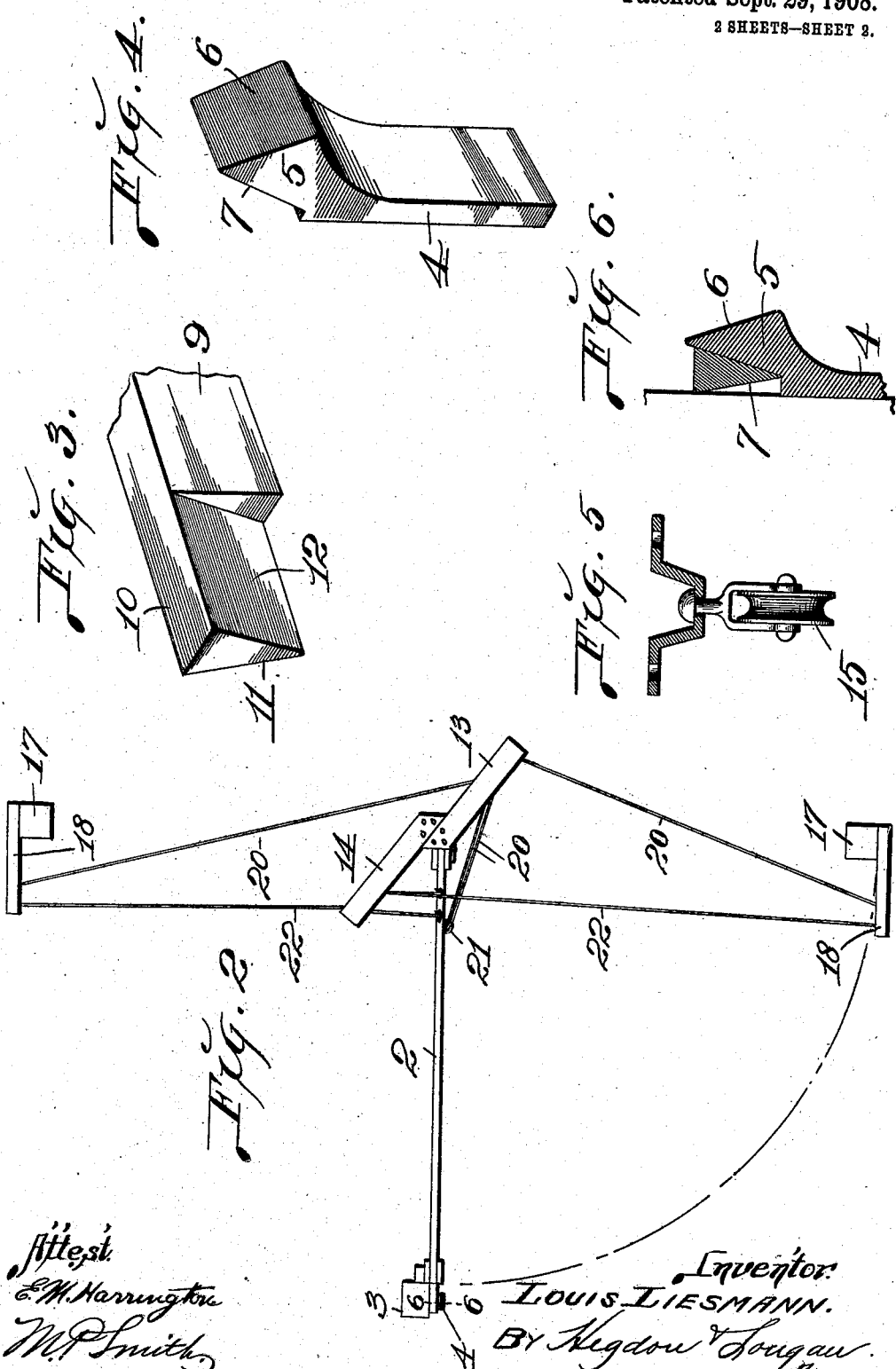

UNITED STATES PATENT OFFICE.

LOUIS LIESMANN, OF DIXON, MISSOURI.

FARM-GATE.

No. 899,747.     Specification of Letters Patent.     Patented Sept. 29, 1908.

Application filed August 6, 1907. Serial No. 387,348.

*To all whom it may concern:*

Be it known that I, LOUIS LIESMANN, a citizen of the United States, and resident of Dixon, Pulaski county, Missouri, have invented certain new and useful Improvements in Farm-Gates, of which the following is a specification, containing a full, clear, and exact description, reference being had to the accompanying drawings, forming a part hereof.

My invention relates to a farm gate, my object being to construct a simple, inexpensive farm gate which is hinged to a post or upright and is adapted to swing against a post positioned on the opposite side of the roadway from the first post, there being means arranged in front of and to the rear of the gate for unlatching and swinging said gate open and closed.

To the above purposes, my invention consists in certain novel features of construction and arrangement of parts, which will be hereinafter more fully set forth, pointed out in the claims, and illustrated in the accompanying drawings, in which:—

Figure 1 is a perspective view of a gate of my improved construction; Fig. 2 is a plan view of the gate; Fig. 3 is a perspective view of one end of a latch used on the gate; Fig. 4 is a perspective view of a block or keeper with which the free end of the gate latch engages when the gate is closed; Fig. 5 is an elevation, partly in section, of a swiveled pulley such as is made use of in my improved gate; Fig. 6 is an enlarged vertical section taken on the line 6—6 of Fig. 2.

Referring by numerals to the accompanying drawings:—1 designates a post, or upright, which is rigidly set in the ground to one side of the roadway, and to which is hinged the gate 2, preferably constructed of a series of horizontally disposed rails framed together at their ends by suitable uprights.

3 designates a post, which is seated in the ground directly opposite the post 1; and fixed on one side of the post, adjacent the upper end, is a block 4, the upper end or head 5 of which is of inverted V-shape in cross section, thus providing a pair of oppositely inclined faces 6 and 7.

Arranged between the two upper rails of the gate, and pivotally arranged on a pin 8, passing horizontally through the uprights at the rear end of the gate, is a latch bar 9, the opposite end of which projects between the uprights at the front end of the gate, and said projecting end is V-shaped in cross section, as designated by 10, thus providing a pair of oppositely inclined faces 11 and 12.

Fixed to the top of the post 1 is a pair of horizontally arranged arms 13 and 14, which are diagonally disposed relatively to the roadway, and arranged on the under side of the end of the arm 13 is a pair of swiveled grooved pulleys 15; and a corresponding pair of grooved pulleys 16 are arranged on the under side of the arm 14.

Arranged at suitable distances away from the post 1, and in alinement therewith, are posts 17, to the upper ends of which are fixed the horizontally arranged arms 18; and arranged on the under side of each arm 18 is a pair of swiveled grooved pulleys 19.

The inner ends of a pair of flexible connections, such as cords or cables 20, are fixed in any suitable manner to the latch bar 9, a short distance from the pivoted end thereof, which cords or cables pass through a staple 21 fixed on the top rail of the gate; and from thence said cords or cables extend upward around the grooved pulleys 15; and from thence said cords or cables extend in opposite directions and pass around the inner ones of each pair of grooved pulleys 19, there being knots 21$^a$ formed in said cables, outside these pulleys.

Fixed to the top rail of the gate, adjacent the staple 21, are the lower ends of a pair of cords or cables 22, which extend upward and around the grooved pulleys 16; and from thence said cords or cables extend in opposite directions to and around the remaining pair of grooved pulleys 19; and the free ends of said cords or cables are provided with weighted handles 23.

The gate is opened from either side by grasping the depending end of the corresponding one of the cords or cables 20, and by pulling down on said cord or cable, the free end of the latch 9 is elevated from its position behind the head 5 of the block 4, and the continued pull upon the cord or cable swings the gate to one side into a position parallel with the roadway. After passing the open gate, the operator closes said gate by engaging the weighted handle 23, and pulling downward upon the same, which action draws the corresponding cord or cable 22 taut; and a continued pull on said cord or cable swings the gate closed. The free end of the latch bar 9 is automatically elevated as the inclined face 11 strikes against the inclined face 6 of the head 5; and when the end 10 of the latch passes over the head 5, said end will drop into position behind said head, thus holding the gate latched in its closed position. The weighted handles 23 normally maintain the cables 22 in comparatively taut positions, and the knots 21ª in the cables 22 prevent the free outer ends of said cables from running through the grooved pulleys 19 over which said cables pass.

To cause the gate to swing completely open or into a position parallel with the roadway, the arm 13 is diagonally disposed on top of the post 1 and extends outward therefrom opposite from the position occupied by the gate when closed; and thus the cords or cables 20, passing around the pulleys 15, exert an outward pull upon the gate even after said gate is swung into a position parallel with the roadway; and to permit the gate to be readily closed, without an excessive pull on the cords or cables 22, the arm 14, carrying the pulleys 16, over which said cords or cables pass, is extended away from the post 1 on the same side with the gate. The inclined faces of the head 5 and end 10 of the latch permit said latch to be easily operated; and all of the pulleys being swiveled, readily adjust themselves to the direction of pull upon the cables 20 and 22 when the gate is opened or closed.

My improved gate can be very cheaply constructed, as it comprises a minimum number of parts, is easily kept in repair, and can be readily operated by a person in a vehicle, or on horseback.

I claim:—

1. The combination with a pair of posts rigidly fixed in the ground on opposite sides of a roadway, of a gate hinged to one of the posts and adapted to close against the opposite post, a latch arranged on the gate, a keeper on the post against which the free end of the gate swings for engaging the latch, a pair of posts arranged on opposite sides of the post to which the gate is hinged, arms fixed to the upper ends of the last mentioned pair of posts and projecting laterally therefrom, swiveled pulleys depending from the under sides of said arms, a pair of diagonally disposed arms rigidly fixed on top of the post to which the gate is hinged, and which arms extend in opposite directions, swiveled pulleys depending from the under sides of the diagonally disposed arms, and operating cables fixed to the gate latch and to the gate and passing over the pulleys on the diagonally disposed arms, and which cables extend from thence to and around the pulleys on the laterally projecting arms.

2. The combination with a pair of posts rigidly positioned in the ground on opposite sides of a roadway, a gate hinged to one of the posts and adapted to close against the opposite post, a latch arranged on the gate, a keeper on the post against which the free end of the gate swings for engaging the latch, a pair of posts arranged on opposite sides of the post to which the gate is hinged, a pair of diagonally disposed arms rigidly fixed on top of the post to which the gate is hinged, one of which arms projects over the roadway, and the other arm projecting in the opposite direction, pulleys arranged on said diagonally disposed arms, and operating cables fixed to the gate latch and to the gate and passing over the pulleys on the diagonally disposed arms, and said pulleys being extended to the pair of posts on opposite sides of the post to which the gate is hinged.

In testimony whereof, I have signed my name to this specification, in presence of two subscribing witnesses.

LOUIS LIESMANN.

Witnesses:
 GEO. W. SHELTON,
 H. E. ROLLINS.